(12) United States Patent
Kuskovsky et al.

(10) Patent No.: US 6,856,399 B2
(45) Date of Patent: Feb. 15, 2005

(54) METHOD AND APPARATUS FOR MEASURING PRESSURE

(75) Inventors: Igor Kuskovsky, Feasterville, PA (US); Mark L. Kuskovsky, Livingston, NJ (US)

(73) Assignee: Modern Optical Technologies L.L.C., Feasterville, PA (US)

( * ) Notice: Subject to any disclaimer, the term of this patent is extended or adjusted under 35 U.S.C. 154(b) by 0 days.

(21) Appl. No.: 10/121,009

(22) Filed: Apr. 11, 2002

(65) Prior Publication Data

US 2002/0186377 A1 Dec. 12, 2002

Related U.S. Application Data

(60) Provisional application No. 60/283,416, filed on Apr. 12, 2001, and provisional application No. 60/283,426, filed on Apr. 11, 2001.

(51) Int. Cl.[7] .............................. G01B 9/02
(52) U.S. Cl. .................................... 356/457
(58) Field of Search ...................... 356/35.5, 457, 356/458, 517, 15, 16, 31; 250/231.19; 359/15, 16, 31

(56) References Cited

U.S. PATENT DOCUMENTS

| | | | | |
|---|---|---|---|---|
| 3,590,640 A | * | 7/1971 | Cindrich | 73/705 |
| 3,627,426 A | * | 12/1971 | Tsuruta et al. | 356/457 |
| 4,136,949 A | | 1/1979 | Hayamizu et al. | |

(List continued on next page.)

FOREIGN PATENT DOCUMENTS

| | | |
|---|---|---|
| SU | 1426186 A1 | 3/1988 |
| SU | 1657948 A1 | 6/1991 |
| SU | 1696855 A1 | 12/1991 |

OTHER PUBLICATIONS

Sukhanov, V.I.; Three–dimensional Deep Holograms and Materials for Recording Them, Journal of Optical Technology, Jan. 1994, pp. 49–56.
Perspective XXI, 2nd Regional Science–Technology Exhibition in Odessa, Ukraine, May 11–13, 2000, pp. 24–25, 30–31, 35.
Belous, V.M. et al., Method of Measuring Small Linear Displacements in the Nanometer Range, Proceedings of the Academy of Sciences of Ukraine, No. 9, 1994, pp. 91–94.
Zelenin, V.S. et al.; Device to Measure Angular Displacements Based on 3–D Diffraction Gratings, Scientific Device Manufacturing (Russian), 4, 1991, pp. 95–98.
Dyachenko, N.G. et al.; Recording of Amplitude–Phase Holograms on the Colloidal–Type Centers in Sodium Chloride Crystals; Ukrainian Journal of Physics, (Russian), 25, 4, 1980, pp. 622–627.
Mandel, V.E. et al.; Using a Steady–State Volume Holographic Diffraction Grating to Amplitude–Modulate Light, Soviet Journal of Optical Technology, Oct. 1994, vol. 61, No. 10, pp. 723–725.

Primary Examiner—Samuel A. Turner
Assistant Examiner—Michael A. Lyons
(74) Attorney, Agent, or Firm—Lerner, David, Littenberg, Krumholz & Mentlik, LLP

(57) ABSTRACT

In one embodiment, an apparatus for measuring pressure is provided including a holographic element containing at least one volume hologram; a reference member; a sensing member coupled to the pressure being measured, and at least one light source; wherein the device operates by passing a reference light beam between the reference member and the holographic element, the reference beam having a constant optical path, and passing a sensing light beam between the sensing member and the holographic element, the sensing beam having optical path that varies as a function of the pressure; the volume hologram converting the reference beam and the sensing beam into an information light beam the intensity of which is a measure of the pressure. Preferably, the reference member and the sensing member are made from the same material.

26 Claims, 7 Drawing Sheets

U.S. PATENT DOCUMENTS

| | | |
|---|---|---|
| 4,945,230 A | 7/1990 | Saaski et al. |
| 5,054,926 A | 10/1991 | Dabbs et al. |
| 5,128,537 A | 7/1992 | Hälg |
| 5,414,507 A | 5/1995 | Herman et al. |
| 5,452,087 A | 9/1995 | Taylor et al. |
| 5,475,489 A | 12/1995 | Gottsche |
| 5,515,459 A | 5/1996 | Farhadiroushan |
| 5,650,612 A | 7/1997 | Criswell et al. |
| 5,714,680 A | 2/1998 | Taylor et al. |
| 5,721,612 A * | 2/1998 | Anderson .................. 356/35.5 |
| 5,844,667 A | 12/1998 | Maron |
| 5,989,923 A | 11/1999 | Lowe et al. |
| 6,219,139 B1 | 4/2001 | Lesniak |
| 6,246,048 B1 | 6/2001 | Ramos et al. |
| 6,281,976 B1 * | 8/2001 | Taylor et al. ............... 356/480 |
| 6,304,686 B1 | 10/2001 | Yamate et al. |
| 6,321,603 B1 | 11/2001 | Berg |

\* cited by examiner

METHOD AND APPARATUS FOR MEASURING PRESSURE

CROSS-REFERENCE TO RELATED APPLICATIONS

The present patent application claims priority to U.S. Provisional Application No. 60/283,416, filed Apr. 12, 2001, which is incorporated herein by reference in its entirety, and U.S. Provisional Application No. 60/283,426, filed Apr. 11, 2001, which is incorporated herein by reference in its entirety.

FIELD OF INVENTION

The invention relates to an optical measurement field, especially to methods for measuring pressure, and devices such as pressure sensors and scales.

BACKGROUND OF THE INVENTION

Precise pressure measurements are necessary in a variety of technological fields. Among the common areas of application for pressure measurement technology are oil and gas processing, such as instrumentation for measuring pressure in oil wells and oil pipelines, monitoring of pressure in industrial and consumer liquid processing devices, such as boilers and the like, medical equipment manufacturing, and various weight measurement instruments, such as scales and the like, that rely on pressure for determining weight, and many other fields of use.

For many applications, measuring pressure requires high precision that is not readily available within the present state of the art, or is expensive thus limiting the market reach of the technology at issue. For example, laboratory scales that provide high precision rely on complex components and therefore are expensive.

The instrumentation for determining pressure of oil wells is one of the principal applications for the pressure measurement technology. For oil-producing industry, the pressure inside an oil well is an important parameter of interest, the monitoring of which allows improvement of the yield from the well. It is especially important in maximizing the lifetime production of the well. At the same time, the pressure sensing components of the pressure measurement system must be placed deep inside the well, where environmental conditions, such as temperature and pressure, are very challenging. Also, the replacement and service of the pressure sensing components is a complicated and expensive process. Therefore, in addition to usual requirements of cost and ability to withstand conditions inside the well, the pressure sensors designed for use in oil wells preferably should be reliable, have a long useful lifetime, and minimal service requirements.

The need for improved pressure measurement technology is widely recognized. The precise measurement of pressure is a challenging goal in and of itself. A variety of pressure sensors are available in the marketplace. One type of conventional sensors is a spring-loaded sensor having a spring that provides a biasing force against the pressure being measured. Such sensors operate by balancing a load again a known biasing force of the spring, and determining the amount of spring deflection and the corresponding pressure exerted upon the spring. The spring-loaded sensors have a number of known disadvantages, such as a relatively low degree of accuracy and the need for repeated re-calibration. Also, it is believed that the spring-loaded sensors cannot reliability operate at high pressures and temperatures.

Other known sensors are piezoelectric transducers, which are often used in pressure gauges and scales. The piezoelectric pressure sensors operate by measuring the electric signal produced in response to changes created by the pressure being measured in a crystal lattice. The piezoelectric transducers also have known disadvantages. They suffer from a need for re-calibration and a relatively short operating life. They also may be expensive and may not have sufficiently high precision for certain applications. The piezoelectric transducers also are believed to require temperature compensation even at modest temperatures due to substantial differences in temperature expansion coefficients of various elements of the transducer and sensor assembly.

For these and other reasons, various forms of optical sensor technology are more and more prevalent in challenging pressure measurement applications. Wave-guide elements, such as optical fiber, are often used as sensing or transmitting structures, or both, in optical sensors.

Generally, fiber optic sensors may be classified as either "intrinsic" or "extrinsic." The "intrinsic" fiber optic sensors rely on properties of the optical fiber itself to measure pressure or other environmental parameters. In addition to pressure, optical fiber sensors include fluid level sensors, temperature sensors, fiber optic gyroscopes, and the like. One type of "intrinsic" optical fiber sensors utilizes a portion of optical fiber having in-core fiber grating, such as Bragg grating (FBG), which functions as an element upon pressure is exerted. The Bragg grating may be formed by doping the optical fiber with various suitable materials (e.g., Ge), and then exposing the doped fiber to an interference pattern, thus producing variations in the refractive index of the fiber transmission core.

An example of the pressure sensor that uses Bragg grating fiber is disclosed in U.S. Pat. No. 6,034,686. The '686 patent discloses several embodiments of intrinsic optical sensors for measuring differential pressure. Essentially, in all of the embodiments of the '686 patent, an FBG element is set transversely to the direction of the pressure. The FBG portion of the fiber optic cable is interrogated with a light source and a detector, with the sensing FBG portion of the fiber being under the transverse strain. The spectral characteristics of the light that passes through the FBG sensing portion vary as a function of the transverse strain, and therefore the pressure, which may then be determined from the spectral analysis. Typically, various spectral demodulation systems such as Fabry-Perot filters, optical spectral analyzers and the like are coupled to the fiber as detectors to interpret the magnitude of spectral changes, with the signal being processed in a usual manner to calculate the strain and the differential pressure. Such spectral sensing methodology may be excessively complicated and require expensive detecting devices.

Other intrinsic fiber optic sensors are disclosed in U.S. Pat. No. 5,714,680. The '680 patent describes an embedded fiber optic sensor having a fiber Fabry-Perot interferometer embedded into a metal part that is located in a housing. Pressure, acting on one end of the metal part, compresses the metal part, with a magnitude of compression sensed by the Fabry-Perot interferometer, thereby providing a measure of the pressure.

Other types of fiber optic pressure sensors are "extrinsic" sensors. In these sensors, the fiber optic cable is used either as a transmitting structure to couple the portion of the device in direct contact with pressure, to a processing station, or to translate the pressure exerted upon a some type of mechanical element into spectral information, and ultimately into an electric signal.

A common type of such sensing element is Fabry-Perot interferometer. Typically, the Fabry-Perot interferometers include two parallel reflective structures facing each other with one of the reflective structures being capable of deflection or movement. When the pressure is applied to the reflective structure capable of deflection and light is passed between the structures, there occurs a change in the interference pattern created by the reflective structure. The change in the interference pattern is a function of the magnitude of deflection. U.S. Pat. No. 5,128,537 describes a pressure sensor that uses a Fabry-Perot interferometer. The '537 patent describes a pressure sensing system that includes two parallel mirrors, one of which is attached to a flexible diaphragm and another is attached to a transparent plate. A light is passed into the space between the mirrors, creating an interference pattern through the transparent plate. The change in the position of the mirror attached to the flexible diaphragm is interpreted on the basis of the changes in the interference pattern.

Many of the presently available optical sensors have a number of disadvantages, some of which are inherent in their construction. Thus, many devices must utilize expensive parts, such as optical spectral analyzers, because of the nature of the pressure-sensing methodology.

Another common disadvantage is the necessity for temperature compensation. In general, the changes in pressure are converted into mechanical movement, which in turn causes changes in either the length or the cross-section of the sensing optical fiber portion. To provide this mechanical movement information to the fiber or other similar structure, most optical sensors rely on direct contact between the fiber and the mechanical part that moves or deflects as a function of pressure (e.g., a diaphragm of the '537 patent or FBG-contacting surface(s) of '686 patent).

However, for many applications, especially in high pressure and temperature applications such as oil well sensors, the position of the flexible mechanical element, and therefore the signal received by a detector, depends not only on the pressure but also on the temperature of the environment. The material of the flexible mechanical element expands differently at different temperatures. Therefore, the temperature changes may be interpreted as the changes in pressure. The changes in temperature may result in an indication of a pressure change that is erroneous, necessating various temperature-compensating elements and mechanisms.

However, as known to those of skill in the art, the temperature compensation mechanisms inevitably rely either on independent temperature measurement or on assumptions regarding thermal expansion. The former has a potential of creating the same problems as the pressure measurement it seeks to correct, and the latter may be incorrect, and may depend on other parameters and their effects on the mechanical parts of the pressure sensing device.

Therefore, there is a need for different and improved pressure sensing devices and methods that provide good precision, require low maintenance, have low cost, have high useful life, and do not require temperature compensation.

SUMMARY OF THE INVENTION

The present invention seeks to address these needs by providing an apparatus for measuring pressure that includes
a holographic element containing at least one volume hologram;
a reference member;
a sensing member coupled to the pressure being measured, and
at least one light source;
wherein the device operates by passing a reference light beam between the reference member and the holographic element, the reference beam having a constant optical path, and passing a sensing light beam between the sensing member and the holographic element, the sensing beam having optical path that varies as a function of the pressure; the volume hologram converting the reference beam and the sensing beam into an information light beam the intensity of which is a measure of the pressure.

Preferably, the sensing member is a moving member, wherein the magnitude of the movement is a function of the pressure.

The sensing member may be a diaphragm, including the diaphragm made from materials having substantially identical coefficients of thermal expansion as the reference member. Preferably, the diaphragm and the reference member are parts of an integral unit made from the same material.

The preferred holographic element is a crystal of alkali halide. The preferred light source is a laser source producing coherent monochromatic light, especially the light source that is a laser source producing coherent monochromatic light having a wavelength of from 635 nm to 680 nm.

Preferably, the apparatus further includes a sensing wave guide element for passing the sensing light beam and a reference wave guide element for passing the reference light beam. In the preferred embodiment, the diaphragm and the holographic element are not in direct contact. Preferably, the apparatus further includes a sensing wave guide element for passing the sensing light beam and a reference wave guide element for passing the reference light beam, wherein the wave guide elements are not in direct contact with the diaphragm or the reference member.

In another preferred embodiment, the apparatus further includes a remote component having the diaphragm and the reference element, and a measuring component having the hologram and the light source.

The holographic element of the apparatus may include one volume hologram or a plurality of volume holograms.

In specific embodiments, the apparatus may be pressure sensing gauge or a scales, including scales having a plurality of volume holograms.

The apparatus may include the sensing member containing transparent material having an index of refraction that changes as a function of the pressure coupled to the sensing member, wherein the sensing light beam passes through the transparent material thereby the optical path of the sensing beam varies as a function of the pressure being measured. Preferably, the transparent material having a low photoelastic co-efficient.

In another preferred aspect, the invention provides an apparatus for measuring pressure including:
a light source capable of emitting at least one primary light beam;
a reference member having a reference surface;
a moving member having a sensing surface and a load surface, the moving member capable of movement or displacement the magnitude of which is a function of pressure applied onto the load surface of the moving member;
a holographic element having at least one volume hologram located in alignment with the light source, the distance between the at least one volume hologram and the reference surface being substantially constant; and at least one signal detector;

wherein, in operation of the apparatus, the at least one volume hologram splits the at least one primary light beam into a first secondary beam and a second secondary beam directed respectively onto the sensing surface of the moving member and the reference surface, wherein the first and second secondary beams are reflected thereby providing respectively a sensing beam having an optical path that changes as a function of pressure applied onto the load surface of the moving member, and a reference beam having a substantially constant optical path, the sensing beam and the reference beam being reflected toward the at least one volume hologram wherein the sensing beam and the reference beam interact thereby providing at least one information beam being detected the at least one signal detector.

Preferably, the apparatus further includes a body including the reference member, the moving member having a first end, a second end, and a central portion, the first end and the second end being rigidly attached to the body thereby upon pressure being applied to the load surface of the moving member, the first end and the end remain stationary and the central portion moves or deflects, the sensing surface of the moving member having a sensing region located within the central portion of the moving member, the sensing region reflecting the first secondary beam; the being part of the body.

The apparatus may further include a sensing wave guide element for passing the sensing light beam and the first secondary light beam, and a reference wave guide element for passing the reference light beam and the second secondary light beam, wherein the wave guide elements are not in direct contact with the diaphragm or the reference member.

In the preferred embodiment, the apparatus further includes a remote component including the body, and a measuring component having the holographic element and the light source. The moving member and the reference member are made from the same material whereby the thermal expansion of the moving member and the reference member is substantially identical.

In another preferred embodiment, the invention provides an apparatus for measuring pressure comprising:

a light source capable of emitting at least one primary light beam;

a reference member having a reference surface;

a stationary member having a beam-return surface;

an optically-transparent photo-elastic element having a load surface, the photo-elastic element possessing an index of refraction that changes as a function of pressure applied onto the load surface;

a holographic element having at least one volume hologram located in alignment with the light source, the distance between the at least one volume hologram and the reference surface being substantially constant; and at least one signal detector;

wherein, in operation of the apparatus, the at least one volume hologram splits the at least one primary light beam into a first secondary beam and a second secondary beam;

the first secondary beam being directed onto the beam-return surface that reflects the first secondary beam thereby providing a sensing beam, at least one of the first secondary beam and the sensing beam passing through the optically-transparent photo-elastic element thereby the sensing beam has an optical path that is a function of pressure applied onto the load surface of the photo-elastic element, the second secondary beam being directed onto the reference surface and being reflected thereby providing a reference beam having a substantially constant optical path, the sensing beam and the reference beam being reflected toward the at least one volume hologram wherein the sensing beam and the reference beam interact thereby providing at least one information beam being detected by the at least one signal detector.

In another preferred aspect, the invention provides a method of measuring pressure that includes providing a reference light beam having a constant optical path;

providing a sensing light beam, the optical path of which changes as a function of pressure;

passing the reference beam and the sensing beam through a volume hologram thereby obtaining at least one signal beam that is a function of the pressure.

DETAILED DESCRIPTION

Figure 1:
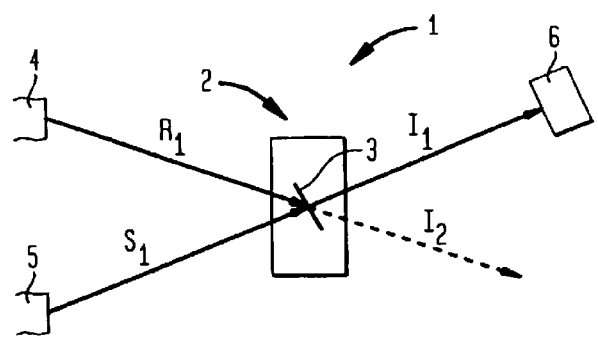
FIG. 1 illustrates a method of measuring pressure in accordance with one preferred aspect of the invention.

While the invention is not based on any single specific theory, the invention recognizes that the properties of volume holograms may be used in measuring physical properties, especially pressure. FIG. 1 illustrates the preferred pressure sensing methodology of the invention. As seen in FIG. 1, the pressure measuring system 1 incorporates a holographic element 2 with at least one volume hologram 3, a reference element 4, a pressure-sensing element 5, and a detector 6. One or more primary light beam(s) provide a reference beam R1, directed from the reference element 4 to the volume hologram 3, and a sensing beam S1, directed from the pressure-sensing element 5 to the volume hologram 3. One or more light sources (not shown) generate the primary light beam(s). The beams R1 and S1 may be created in a variety of ways, some of which will be described below in reference to more specific embodiments. Thus, the beams R1 and S1 may be produced by using the volume hologram 3 to split a primary light beam from a single light source; by utilizing a separate splitting element (e.g., a prism) with or without a system of mirrors; by using multiple light sources, and the like. In general, any optical methodologies, including those known to skilled in the art, may be used to produce the beams R1 and S1.

The optical path of the reference beam R1 is kept essentially constant. As known to those of skill in the art, optical path depends on the distance its travels and the index of refraction of the medium. Thus, to main maintain a constant optical path for the reference beam R1, the distance and the conditions of the medium between the reference element 4 and the holographic element 2 are kept constant. For example, the relative locations of the reference element 4 and the holographic element 2 may be kept constant. If the reference beam R1 is produced by reflection from the reference element 4, the beam R1 travels the same distance and its optical path remains constant unless there is change in the index of refraction of the medium.

The optical path of the sensing beam S1 varies as a function of the pressure coupled to the sensing element 5. Preferably, either the index of refraction of the medium along the sensing beam S1 or the distance between the elements 3 and 5 changes as a function of pressure. Sensing elements of various constructions would be suitable with the system 1. For example, the sensing element 5 may include a diaphragm or other moving element that deflects under pressure, or is displaced by the pressure being measured, with the magnitude of deflection being greater at greater pressures. Thus, the sensing beam S1 may be produced by reflection from the surface of the diaphragm; the optical path of the sensing beam S1 would depend on the magnitude of the diaphragm deflection, and therefore would be a function of pressure exerted upon the diaphragm.

The medium between along the beam R1 and/or the beam S1 may be gaseous or a vacuum, or may contain solid or semi-solid substance. For example, optical fiber or other wave-guide elements may be interposed between the reference element 4 and/or the sensing element 5 and the holographic element 2. Whether or not the solid elements are interposed along the beams R1 and S1, preferably, the system 1 operates without direct contact between holographic element 2 or wave-guide elements and the elements 4 and 5.

Preferably, the beams R1 and S1 are monochromatic light beams of the same wavelength. More preferably, the beams R1 and S1 are coherent light beams, such as laser beams. Also, it is preferred that the wavelength of the beams R1 and S1 is the same as the wavelength used to record the hologram. More than one sensing beam and/or more than one volume hologram may be utilized to obtain pressure measurement based on multiple data points.

It is a property of volume holograms that if two light beams enter the hologram under Bragg angle, the resulting exiting beam(s) has intensity that depend on the phase difference ($\Delta\phi$) between the incoming beams. If the optical path of one of the incoming beams is constant, and the optical path of the second incoming beam is changing, the intensity of the resulting exiting beam(s) will vary as a function of the changing optical path of the second incoming beam.

The system 1 operates by using the volume hologram 3 to read a change in the optical path of the beam S1 that, in turn, changes as a function of pressure coupled to the sensing element 5. As seen in FIG. 1, the sensing beam S1 and the reference beam R1 are directed onto the volume hologram 3 of the holographic element 2 substantially under Bragg angle. The beams S1 and R1 interact providing at least one information beam $I_1$. While the invention is not limited to any specific theory, the interaction between the beams S1 and R1 is believed to diffraction and interference. Since the beams S1 and R1 are preferably coherent monochromatic light beams of the same wavelength that fall onto the hologram 3 under Bragg angle, the hologram 3 diffracts the beams, producing a transmitted beam and a diffracted beam for each of the beams R1 and S1. The transmitted beam(s) and the diffracted beam(s) have the same direction and wavelength, and thus undergo interference, with the product of the interference being the information beam $I_1$ (as well as the beam $I_2$ that may not be present in some conditions or may not be detected and used to measure the pressure).

As explained, the intensity of the beam $I_1$ is a function of the phase difference ($\Delta\phi$) between the beams R1 and S1, which depends on the optical path of the beam S1. The signal detector 6 measures the intensity of the information beam $I_1$, providing information about the optical path of the beam S1, and thus the pressure coupled to the sensing element 5.

Any methods known in the art may be used to describe the relationship between the intensity of beam $I_1$ and the phase difference $\Delta\phi$ between the beams S1 and R1 (and thus the change in the optical path of the beam S1). One suitable mathematical relationship, provided for the purpose of illustration, is the equation $I_1 = I_c(1 - \sin(\Delta\phi))$, where $I_c$ is intensity constant of the system 1. For additional description of properties of volume holograms, please see, for example, Mandel et al., The Use of Volume Holograms for Amplitude Modulation of Light, Soviet Journal of Optical Technology, 10, 19–21 (1994), incorporated herein by reference in its entirety.

Figure 2A:
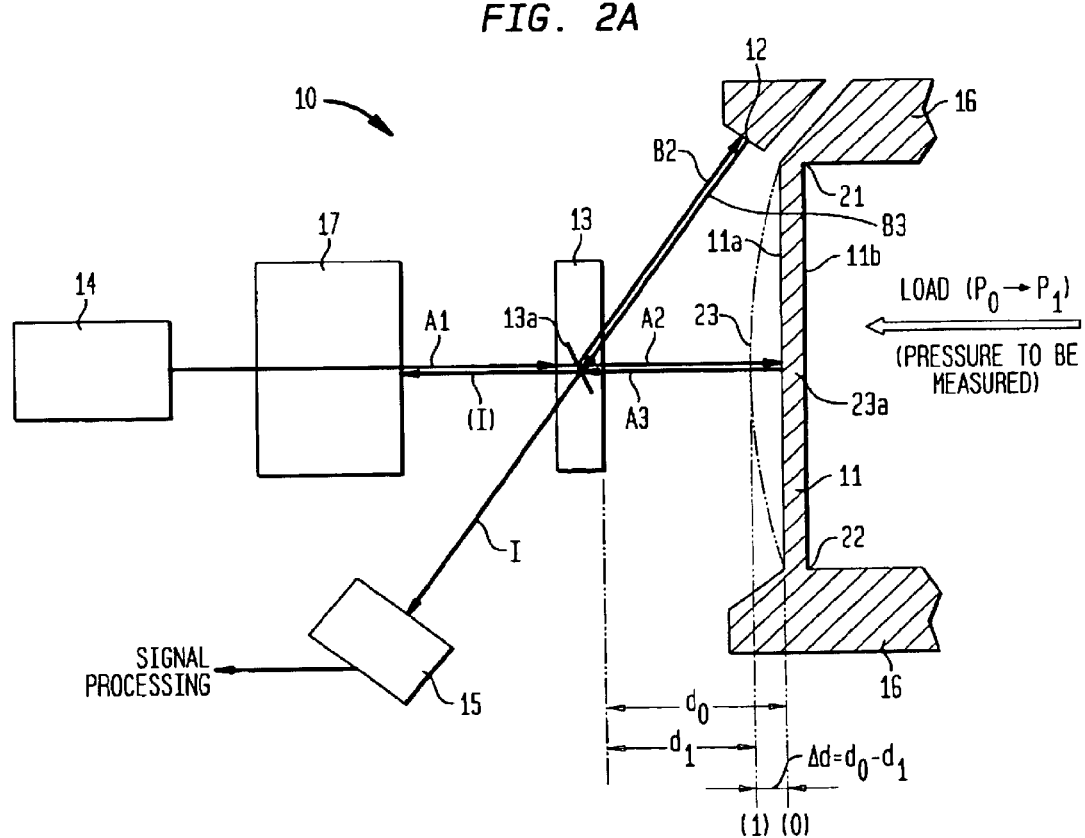
FIG. 2A is a schematic representation of one variant of a preferred embodiment of the apparatus of the invention.

The methodology of the invention may be implemented in an apparatus for measuring pressure. Two variants of the preferred embodiment of an apparatus 10 of the invention are shown in FIGS. 2A and 2C. The apparatus 10 includes a diaphragm 11, a reference surface 12, a holographic element 13 having at least one volume hologram 13a, a light source 14, a signal detector 15, and a stationary diaphragm holding member 16 (FIG. 2A). A pinhole assembly 17 may be included to improve spatial coherence and/or to select a single mode from the light beam emitted by the light source 14. It should be understood that the apparatus 10 may include other suitable devices and systems without departing from the scope of the present invention.

The diaphragm 11 has a sensing surface 11a capable of reflecting light and a load surface 11a. The diaphragm 11 includes diaphragm ends 21 and 22, and a central sensing region 23. As seen in FIG. 2A, the central sensing region 23 of the diaphragm 11 may deflect under pressure (shown by the LOAD arrow) applied to the load surface 11b, while the ends 21 and 22 remain rigidly attached to the stationary diaphragm-holding member 16. The magnitude of deflection of the diaphragm 11 is a function of the pressure upon the load surface 11b.

Referring to FIG. 2A, for example, if LOAD pressure upon the load surface 11b increases from $P_0$ to $P_1$, the displacement or deflection $\Delta d$ of the diaphragm 11 is a function of the pressure change (increase) $\Delta P$ ($\Delta P = P_1 - P_0$).

The reference surface 12 may be a surface of any stationary element of the apparatus 10 capable of reflecting light. Preferably, the reference surface 12 is made of the same material as the diaphragm 11 or of material having substantially identical or very similar heat expansion coefficient. Also, it is preferred that the reference surface 12 is located near the diaphragm 11 to minimize temperature differential between the central sensing region 23 and the reference surface 12.

The holographic element 13 is made of media suitable for recording and storing volume (3-D) holograms. Suitable media includes, for example, alkali halide or binary glassy chalcogenide semiconductor. The media suitable for preparation of the holographic elements is discussed in greater details below. The nature of the desired holographic element is related to the wavelength of the light source 14, including relationships known to those of skill in the art.

Preferably, the holographic element 13 is rigidly positioned between the laser source 14 and the diaphragm 11 so that the volume hologram 13a is aligned with the light source 14. The rigid positioning of the holographic element 13 provides essentially constant distance between the volume hologram 13a and the reference surface 12.

The light source 14 is generally a laser that produces coherent light in a suitably narrow range of wavelengths, preferably monochromatic light. For example, the light source 14 may be a semiconductor laser diode, a solid-state laser, or any other suitable source of light. In a particular embodiment, the light source 14 is a continuously operating laser diode. The preferred operational wavelength(s) of the light source 14 vary depending on the application. Generally, He—Ne laser source (~632 nm) and laser sources producing monochromatic light with a wavelength from 635 nm to 685 nm are preferred for use with alkali halide holographic elements.

The relative positioning of the light source 14, the holographic element 13, the diaphragm 11, and the reference surface 12 affects the operation of the apparatus 10. Preferably, the light source 14 and the holographic element 13 are permanently fixed in any manner known in the art. The source 14 and the holographic element 13 are aligned so that a light beam emitted the source 14 falls onto the hologram 13a under the Bragg angle. As known to those of skill in the art, it is a characteristic property of volume holograms to split a light beam of suitable wavelength that enters the volume hologram at the Bragg angle into a transmitted light beam and a diffracted light beam, both of which exit the volume hologram under angles substantially equal to the Bragg angle of the hologram. For each given hologram, the angle between the diffracted and transmitted beams is known or easily determined. Thus, the holographic element 13, Bragg-aligned with the source 14, is positioned relative to the diaphragm 11 and the reference surface 12 so that either the transmitted beam or the diffracted beam falls onto the sensing surface 11a of the diaphragm 11 in the sensing region 23, and the remaining beam falls onto the reference surface 12. In the example shown in FIG. 2A, the transmitted beam falls onto the diaphragm 11, and the diffracted beam onto the reference surface 12.

If only one hologram is recorded (13a) in the holographic element 13, the light beam exiting the element 13 falls onto a single sensing point 23a of the sensing region 23. However, it should also be noted that more than one hologram may be recorded into the holographic element 13a. Thus, the apparatus 10 may include a holographic element having a plurality of holograms having different spatial orientations, with each hologram providing a beam that falls onto different points of the sensing region 23 and is reflected as a different sensing beam into the corresponding holograms.

In operation, the light source 14 emits a beam A1 that passes through the pinhole assembly 17 and falls onto the volume hologram 13a of the holographic element 13 at the Bragg angle (FIG. 2A). The hologram 13a splits the beam A1 into a beam A2 and a beam B2. The beam A2 is directed at the point 23a of the sensing surface 11a of the diaphragm 11. The beam B2 is directed at the reference surface 12. Both beams exit the hologram 13a under angles substantially equal to the Bragg angle, and are reflected back to the hologram 13a as a reference beam B3 and a sensing beam A3 along the same optical paths as the beams B2 and A2, respectively.

The optical path of the beam B3 is constant. The optical path of the beam A3 depends on the distance from the holographic element 13 to the sensing point 23a. As described above, the deflection $\Delta d$ is a function of the change in pressure applied onto the load surface 11b of the diaphragm 11. The deflection $\Delta d$ may also be measured as a change in the distance between the holographic element 13 and the sensing point 23a ($\Delta d = d_0 - d_1$, where $d_0$ is the distance at pressure $P_0$, and $d_1$ is the distance at the pressure $P_1$ (FIG. 2A)). Thus, the optical path of the sensing beam A3 is a function of pressure change $\Delta P$ ($\Delta P = P_1 - P_0$).

The beams A3 and B3 enter the hologram 13a under the Bragg angle. At the hologram 13a, the beams A3 and B3 diffract and interfere, producing information beam I that also exits the hologram 13a under an angle substantially equal to the Bragg angle. The signal detector 15, preferably a photodiode located at the spatial position for detecting the information beam I, measures the intensity of the beam I.

The intensity of the beam I changes a function of the deflection $\Delta d$, which as described above may be easily correlated with the pressure change $\Delta P$. As described above, the intensity of the beam I may be correlated with the phase difference $\Delta \phi$ as $I = I_c(1 - \sin(\Delta \phi))$. In turn, the phase difference $\Delta \phi$ between the beams A3 and B3 may depend on the deflection $\Delta d$: $\Delta \phi = 2\pi/\lambda(2n\Delta d)$. Thus, the intensity of the beam I likely depends on the deflection Ad as a sinusoidal function.

Figure 2B:
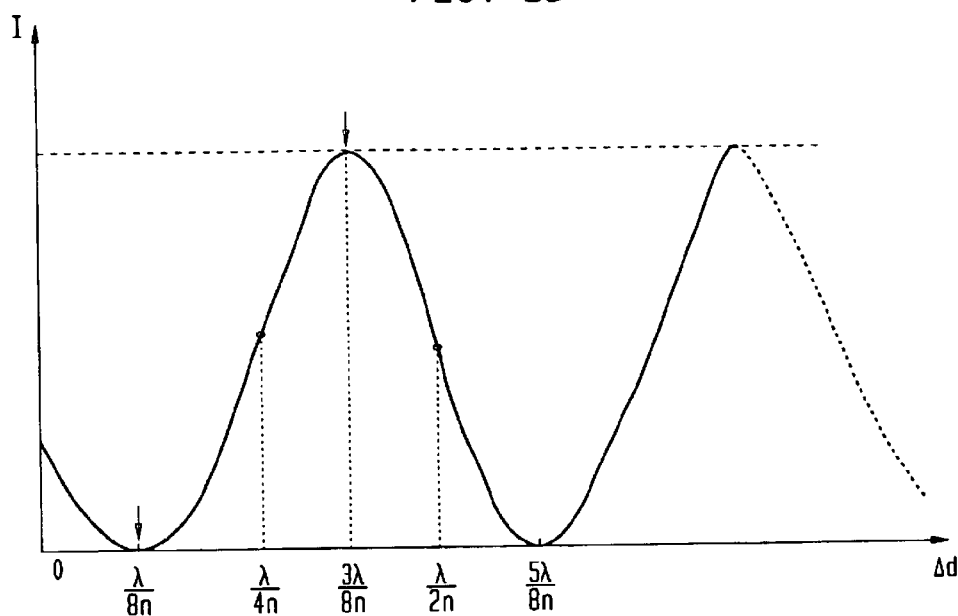
FIG. 2B illustrates an example of suitable mathematic model for measuring pressure in accordance with the methodology of the invention.
Figure 2C:
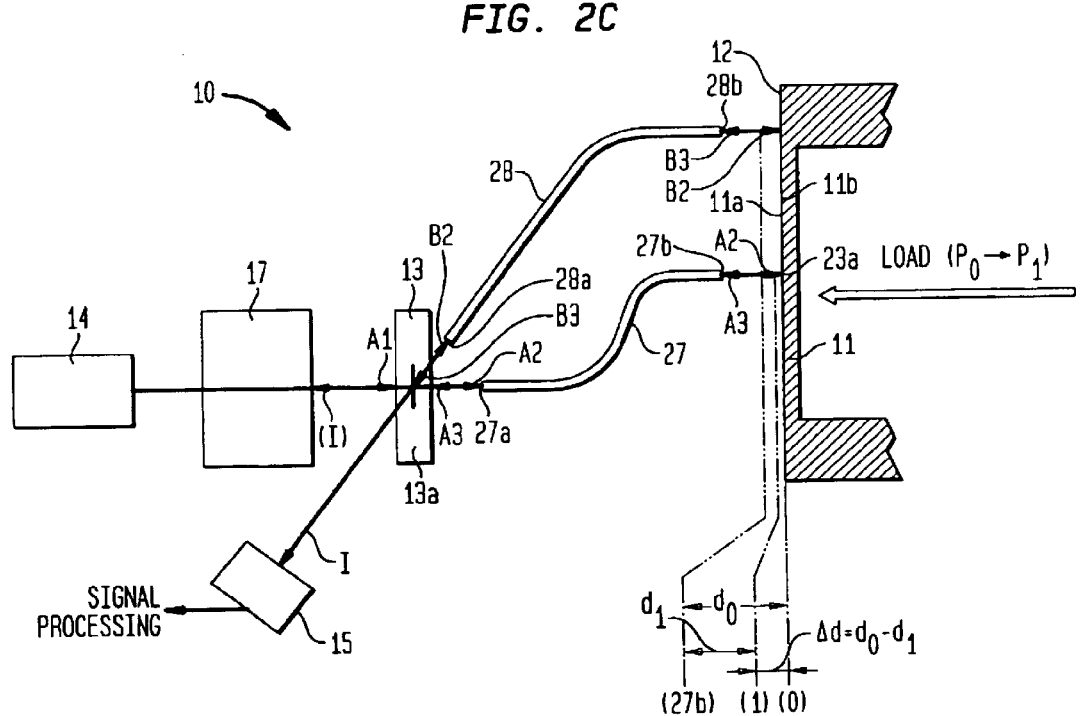
FIG. 2C is a schematic representation of another variant of the preferred embodiment of the apparatus of the invention.

FIG. 2B shows a non-limiting example of the relationship between the deflection $\Delta d$ and the intensity of the beam I. Preferably, the material and the construction of the diaphragm 11 are selected so that the intensity of the beam I varies between the deflection data points shown by arrows.

The intensity of the beam I is registered by the signal detector 15 and transformed into an output electrical signal, which may be measured and manipulated in any way known in the art to determine the deflection of the diaphragm 11 and consequently the pressure upon the load surface 11b.

Another variant of the apparatus 10 is shown in FIG. 2C. The holographic element 13 and the diaphragm 11 may be in remote locations by using wave-guide elements, such as fiber optic cable. As seen in FIG. 2C, the beams A2 and B2 may delivered to desired spatial points via wave-guide elements 27 and 28 (e.g., fiber optic cables), respectively. One skilled in the art would appreciate that the fiber optic cables 27 and 28 may be manipulated in any desired manner. The fiber optic cable 27 has open ends 27a and 27b, placed into desired spatial points near the holographic element 13 and diaphragm 11, respectively. Likewise the fiber optic element 28 has open ends 28a and 28b, connecting the reference surface 12 and the holographic element 13. Preferably, the open ends of the fiber optic elements 27 and 28, especially the open ends 27b and 28b, do not come in a direct contact with the diaphragm 11. The open ends of the fiber optic elements 27 and 28 may be permanently fixed by any appropriate clamps or other holding elements (not shown).

The distance between the open ends 27a and 28a, and the holographic crystal 13 is kept constant. Likewise, the optical path of the light beams inside the fiber optic cables remains constant in the absence of external strains. Also, the distance between the open end 28b and the reference surface 12 is kept the same. Therefore, optical path of the reference beam B3 is constant. Referring to FIG. 2C, the distance between the end 27b and the sensing point 23a changes as a function of pressure in the same manner as described above. The deflection $\Delta d = d_0 - d_1$ is measured by registering the intensity of the beam I with the signal detector 15.

An important advantage of the apparatus 10 is that it is believed to require little or no temperature compensation, especially if the reference surface 12 and the diaphragm 11 are made of the same material and located near each other. As described in Background, many prior art pressure sensors utilize direct contact between a diaphragm that transfers pressure information and the optical sensing element (e.g., optical fiber). Because of the properties of volume holograms, such direct contact while possible in the apparatus of the invention, is not preferred, necessary, or required. If the material of the reference surface 12 and the diaphragm were the same, thermal expansion would equally affect the optical paths of both beams A3 and B3 equally. It is believed that for this reason, the temperature of the environment would have no effect on the pressure reading provided by the apparatus 10.

It should be noted that the intensity of the beam I provides direct information about the differential pressure $\Delta P = P_1 - P_0$ rather than absolute pressure $P_1$. If absolute reading of pressure is required (e.g., $P_0 > 0$), the apparatus 10 may be calibrated, for example by using a reference pressure-measurement technique and the plot shown in FIG. 2B.

Figure 3:
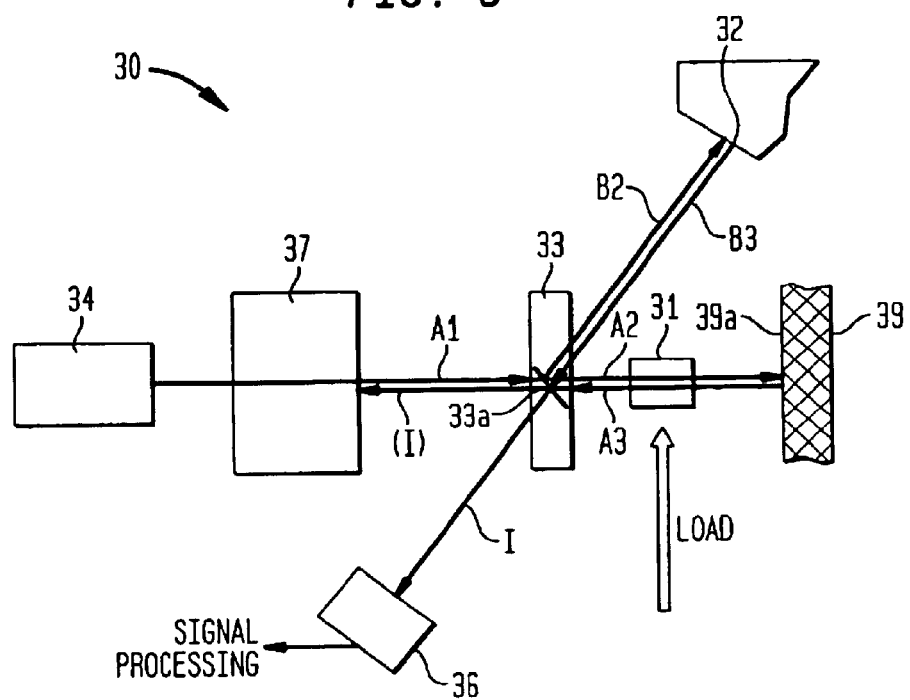
FIG. 3 is a schematic representation of another preferred embodiment of the apparatus of the invention.

Another embodiment of the apparatus of the invention is shown in FIG. 3. An apparatus 30 includes a light source 34, a holographic element 33 with at least one volume hologram 33a, a reference surface 32, and a signal detector 36. The apparatus 30 also includes a beam-return surface 39 and a photo-elastic element 31. The photo-elastic element 31 is made of optically transparent material that changes its refractive index as a function of pressure. Such materials and their properties are well known to those of skill in the art. See, for example, U.S. Pat. No. 6,219,139, incorporated herein by reference in its entirety. The suitable materials include various plastics known for their photo-elastic properties. The preferred materials have low photo-elastic coefficients.

In operation, similarly to the embodiment shown in FIGS. 2A and 2C, the holographic element 33 splits the primary beam A1 emitted by the light source 34 into beams A2 and B2. The beam B2 is reflected by the reference surface 32 providing a reference beam B3. The beam A2 is directed at the surface 39a of the beam-return element 39, providing a sensing beam A3. The sensing beam A3 (as well as the beam A2) passes through the optically transparent photo-elastic element 31. The optical path of the sensing beam A3 depends on the index of refraction of the photo-elastic element 31. The pressure being measured is applied, preferably in a transverse manner to the sensing beam A3, to the photo-elastic element 31, thus changing its index of refraction. It is believed that the change in the index of refraction ($\Delta n$) is a function of the change in the cross-section of the photo-elastic element 31, which in turn is a function of pressure. Therefore, the change in the optical path of the sensing beam A3 provides information about the pressure exerted, directly or indirectly, on the photo-elastic element 31.

The beams A3 and B3 are reflected back to the hologram 33a. At the hologram 33a, the beams A3 and B3 diffract and interfere, producing information beam I, the intensity of which is measured by the signal detector 15.

The methods and apparatuses of the invention can be used in a number of fields, including consumer, laboratory and medical scales, oil wells and pipeline sensor devices and gauges, and many others.

Figure 4A:
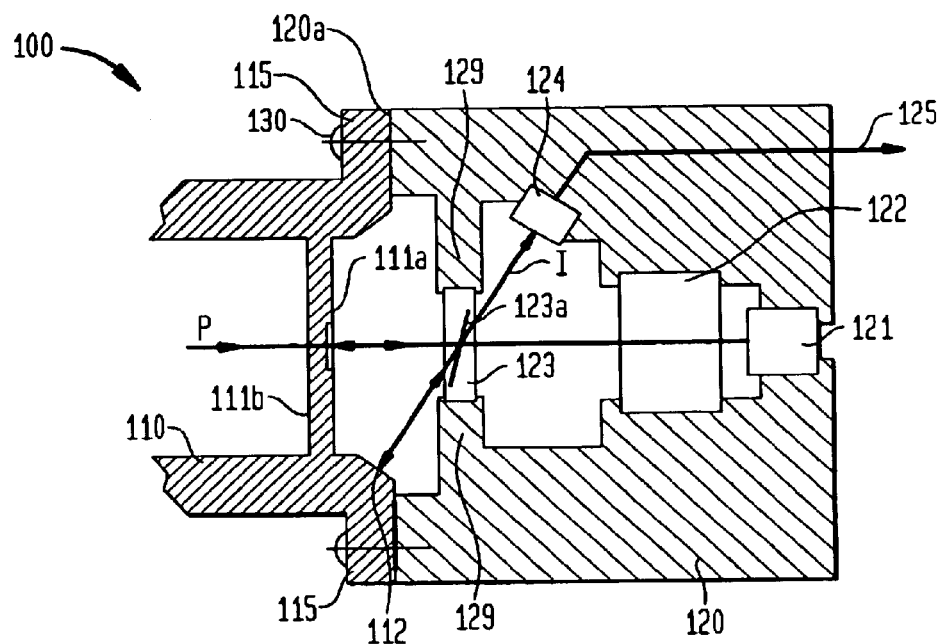
FIG. 4A is a cross-sectional view of one specific embodiment of the pressure sensor device in accordance with the invention.

The specifically important area of application is pressure gauges, such as oil well pipeline pressure measuring sensors. FIG. 4A shows an embodiment of a pressure sensor 100 that includes a pressure housing 110 attached to a sensor body 120 via fastener(s) 130. The sensor body 120 encloses a laser source 121, a pinhole assembly 122, a holographic crystal 123 having at least one volume hologram 123a, and a photodiode 124. The photodiode 124 is coupled to a signal transmission element 125 that transmits electrical signal from the photodiode for processing. The holographic crystal 123 is firmly fixed in place by holding member(s) or fingers 129.

The pressure housing 110 includes a flange 115 for attaching the pressure housing 110 to the side surface 120a of the sensor body 120. The pressure housing include a diaphragm 111 having a sensing surface 111a and a load surface 111b that bears the pressure shown as arrow P. The pressure housing 110 also includes a reference surface 112 located adjacent to the diaphragm 111. As seen in FIG. 4A, the pressure housing 110 may be constructed as an integrated unit, in which the reference surface 112 and the diaphragm 111 are made of the same material and have identical thermal expansion coefficients. For this reason, the thermal expansion of diaphragm 111 and the reference surface 112 is believed to be the same, reducing or eliminating the need for temperature compensation. The sensor 100 may be made of materials typically used for manufacturing pressure sensor devices and suitable for the intended application. If wave-guide elements are used with the apparatus 100, it is believed that inexpensive plastic fiber is suitable for use in the device 100.

The operation of the sensor 100 is similar to the operation of the apparatus described in reference to FIG. 2A. The laser source 121 emits a primary light beam, which is split by the holographic crystal 123. The transmitted beam is reflected off the sensing surface 11a of the diaphragm 111 back to the crystal 123. The refracted beam is reflected off reference surface 112. The intensity of the diffracted/interference product beam I is recorded by the photodiode 124 and transmitted via the signal transmission element 125 for further processing.

The device shown in FIG. 4A is useful for a variety of applications, for example, as a pressure sensing station for oil pipelines. The device 100 may be attached to the side pressure tap of a pipe to provide continuous information about the pressure in the pipe. Preferably, the holographic crystals used in the sensor 100 are alkali halide crystals (e.g., KCl and NaCl), which are very inexpensive and simple in use.

Figure 4B:
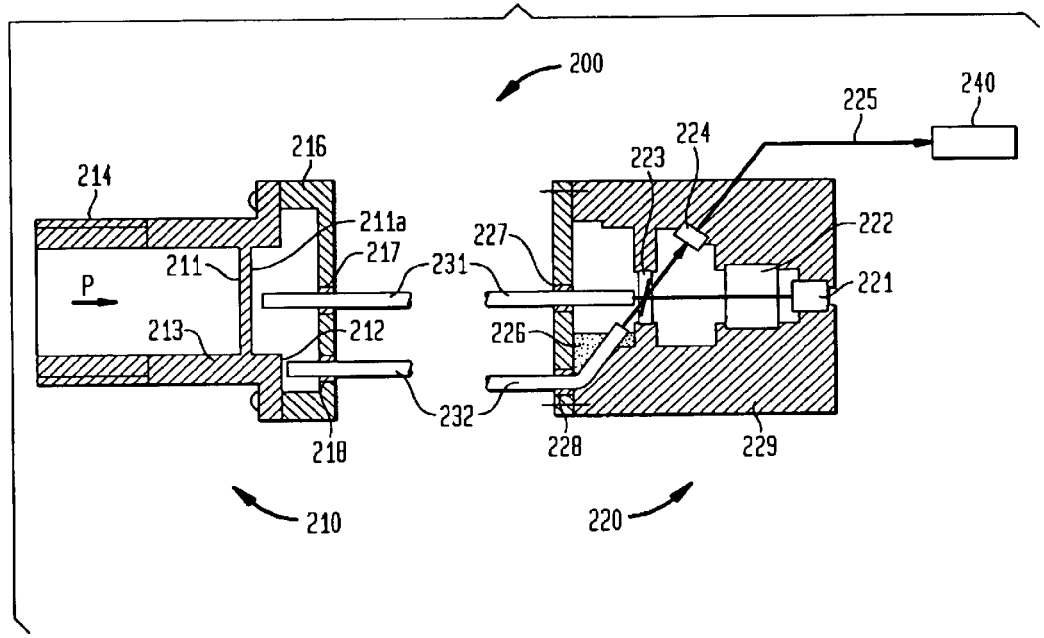
FIG. 4B is a cross-sectional view of a specific embodiment of the pressure sensor system in accordance with the invention.

The device 100 shown in FIG. 4A utilizes direct light reflection. It is believed to be most suitable for applications that do not require remote sensing. If a separation between the subject of pressure measurement and the pressure sensor is desired, as, for example, in oil well applications, wave-guide elements (e.g., fiber optic cables) may be used. FIG. 4B shows an embodiment of a remote pressure sensing system 200 similar to the apparatus shown in FIG. 2C. The system 200 includes a remote sensing component 210 and a holographic measuring/processing component 220. Substantial distances may separate the components 210 and 220. For example, the component 210 may be lowered into an oil well, whereas the component 220 may remain on the surface. The components 210 and 220 are connected by at least two wave-guide elements, such fiber optic cables: a sensing cable 231 and a reference cable 232. The sensing component 210 includes a cover 216 and a housing 213 coupled to a tap 214. The housing 213 includes a diaphragm 211 with the sensing surface 211a and a reference surface 212. The component 210 may be self-enclosed discrete unit or may be a part of larger device.

The sensing fiber optic cable 231 is rigidly positioned at a predetermined distance from a sensing surface 211a of the diaphragm 211. Likewise the reference fiber optical fiber 232 is positioned at a fixed distance from the reference surface 212. The diaphragm 211 operates to transfer pressure information in the manner described above. The fittings 217 and 218 seal the respective fiber optic cables 231 and 232. The fitting may also be used as position fixing elements.

The fiber optic cables 231 and 232, as well as any other desired structures known in the art, connect the remote sensing component to the measuring/processing component 220 that includes a light source 221, a pinhole assembly 222, a holographic crystal 223, and a photodiode 224, enclosed by a body 229 and a cover 226 with fittings 227 and 228. It should be noted that if substantial distance is present between the components 210 and 220, inexpensive plastic fiber may be inadequate, and the preferred operating wavelength of the light source 221 may be 780 nm or higher.

The operation of the component 220 is similar to that described previously in reference to the apparatus of FIG. 2C. The signal is collected by the signal detector 224, and transmitted via the transmitting element 225 to a processing block 240.

The system 200 has important advantages. Thus, the component 220 may be placed at convenient location, and may operate at ambient environmental conditions. The service and replacement of the component 220 is also facilitated. Further, the remote component 210 includes very small number of parts that would be subject to environmental degradation or excess wear. In yet another advantage, the remote component 210 may be placed completely at a remote location within the medium the pressure of which is to be measured, thereby the temperature of the diaphragm 211 and the reference surface 212 being substantially the same, eliminating or minimizing the necessity for temperature compensation. If the remote component 210 is placed in a high temperature environment, the entire component is likely to be at the same temperature. The presence of temperature gradient between the diaphragm 211 and the surface 212 in such an environment is highly unlikely. Thus, the sensor component 210 is unlikely to provide distorted pressure information.

Figure 5A:
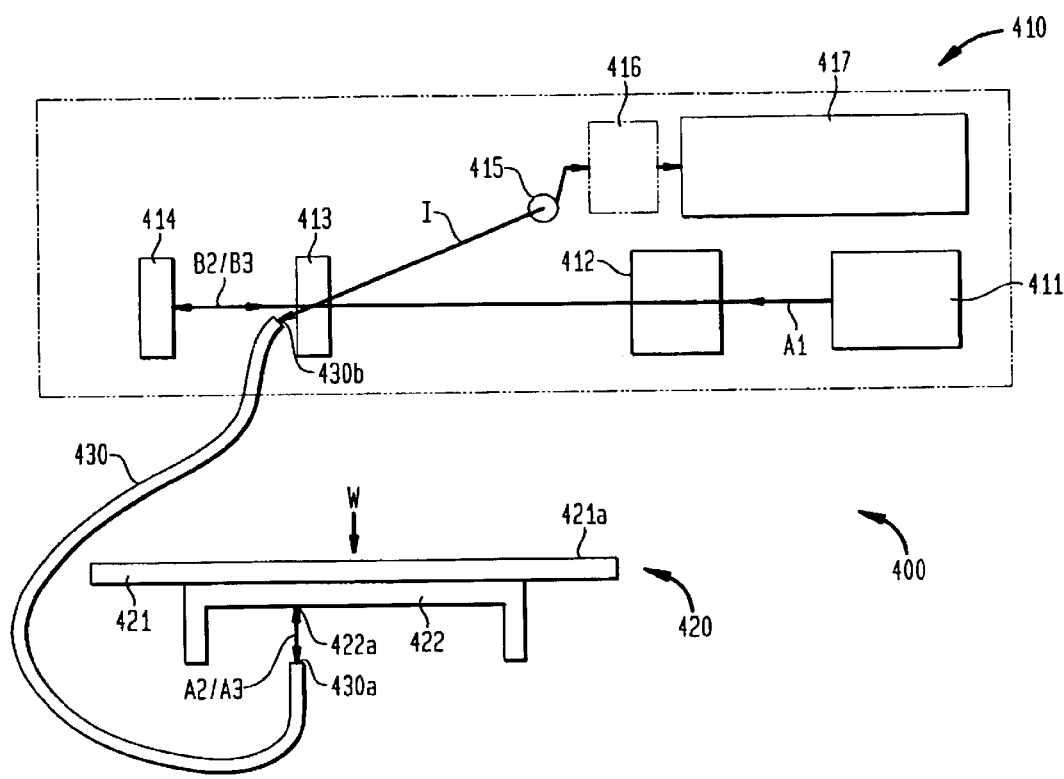
FIGS. 5A-5C show schematic representations of various embodiments of scales in accordance with the invention.
Figure 5B:
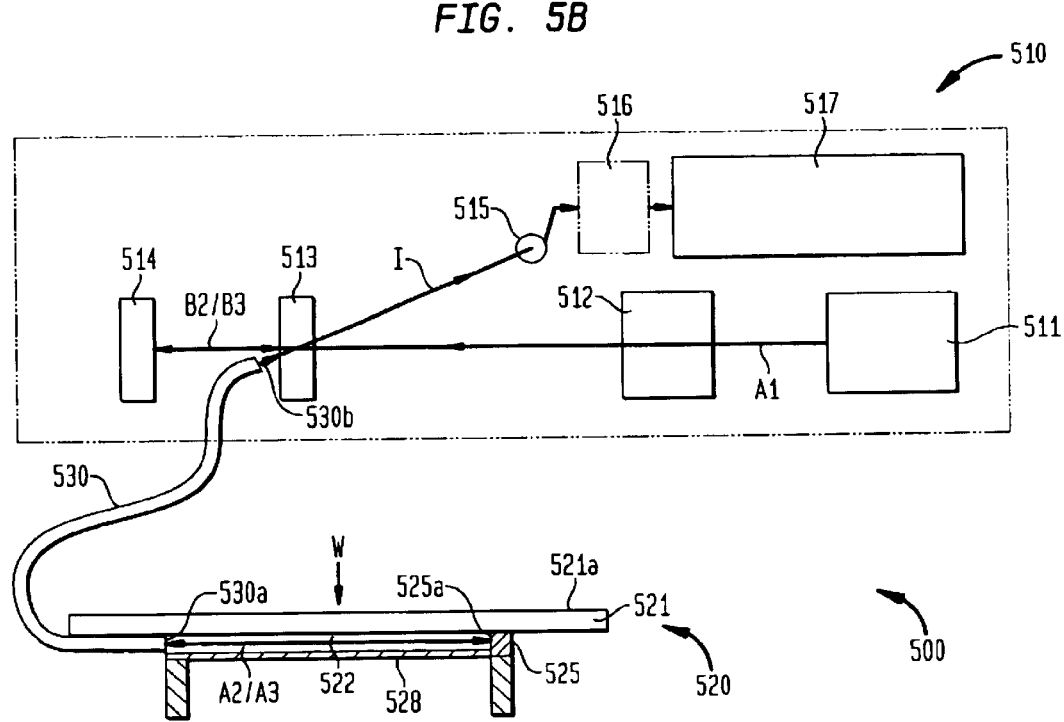
Figure 5C:
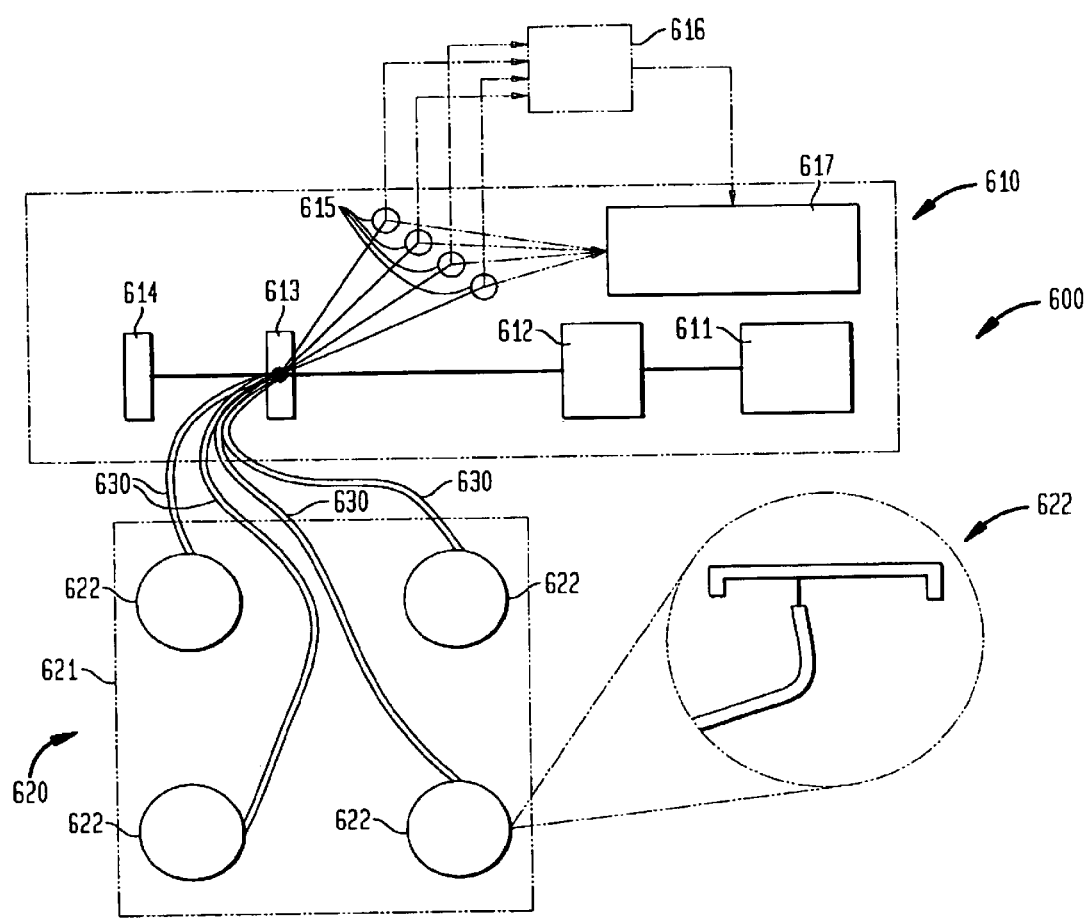

Another application of the pressure sensing methodology of the invention is various types of weight measuring devices, such as laboratory scales, medical scales, and the like. FIGS. 5A-5C show various embodiments of the scales according to the invention. A single point scales 400 shown in FIG. 5A includes a measuring/display component 410 and a weight contact component 420. The weight contact component 420 has a weighing platform 421 with a weighing surface 421a and a spring element 422. The object to be weighted is placed on the weighing platform 421, exerting pressure (shown by arrow W) on the spring element 422.

The component 420 is connected to the measuring/display component 410 by a fiber optic cable 430 having open ends 430a and 430b. The open end 430a is fixed in place at a predetermined distance from the spring element 422. The end 430b is fixed at a desired distance from a holographic element 413 of the component 410. The component 410 also may include a light source 411, a pinhole assembly 412, a stationary beam-return element 414, a photodiode 415, a processing block 416 and a display 417.

In operation, the primary beam A1 is split, with the beam B2 reflected by the element 414, providing the reference beam B3. The beam A2/sensing beam A3 travel along the fiber optic cable 430 to a sensing point 422a and back to the holographic element 413. The pressure W exerted upon the surface 421a of the weighing platform 421 deflects the spring element 422, changing the distance between the sensing point 422a and end 430a of the fiber optic cable 430. The change in the distance is changing the optical path of the sensing beam A3, and thus the intensity of the information beam I detected by the photo-detector 415. The change in intensity is processed by the processing block 416 and displayed by the display 417.

In another embodiment, FIG. 5B shows a scales 500 that includes a photo-elastic element. The scales 500 includes a measuring/display component 510 and a weight contact component 520. The component 510 is substantially identical to the component 410 of the scales 400. The weight contact component 520 includes a weight platform 521 having a weighing surface 521a, a beam-return element 525 with a vertical reflective surface 525a, and a photo-elastic element 522 atop a rigid platform 528.

The component 510 is connected to the component 520 via a fiber optic cable 530 having a end 530a and 530b, terminating respectively in the photo-elastic element 522 and near the holographic crystal 513.

With pressure W exerted on the surface 521a, the weighing platform 521 compresses the photo-elastic element 522 against the platform 528, changing the cross-section of the photo-elastic element 522. The beams A2/A3, which travel between the reflective surface 525a of the beam-return element 525 and the open end 530b of the fiber optic cable 530, change optical paths due to a change in the index of refraction of the photo-elastic element 522. The change in the optical path is reflected in the intensity of the information beam I, detected by the photo-diode 515, and shown I=on the display 517.

As shown in FIG. 5C, the scales utilizing the holographic measurement methodology may also be built as a multi-point scales 600 that include a weight contact component 620 having a plurality of spring elements 622. A measuring/display component 610 of the scales 600 is substantially identical to the component 410 of the scales 400, with the exception of having a plurality of holograms within a holographic element 613 that corresponds to the number of the spring elements 622 and the corresponding number of photodiodes 615.

The multi-point scales 600 will have several spring elements 622 that could change their positions independently of each other and with different rate. The change in the locations of the spring elements could be measured independently by the plurality of photodiodes 615. The rate of change may depend on the location of the center of gravity of the applied weight on the weighing platform 621. By comparing the outputs of the photodiodes 615, a improved precision of measurement may be achieved.

The holographic elements utilized in the methods and devices of the invention have volume (3-D) holograms recorded in a suitable media. Preferably, holograms are recorded in solid media, more preferably, alkali halide media. The preferred alkali halide media for recording the 3-D holograms include KCL and NACL. However, other alkali halide and non-alkali halide materials may also be used. For example, KBR, binary glassy chalcogenide semiconductors (e.g., $As_2S_3$ and $As_2Se_3$), and lithium niobite may be used.

To obtain a hologram in a crystal of alkali halide, the crystal is first grown by any methods known to those skilled in the art, for example by the methods of Bridgeman or Kiropolus. Certain additives or activators may be added to increase the photosensitivity of the alkali halide crystal. Such additives or activators may include, for example, divalent cations or anions, such as $Cu^{2+}$, which are believed to help produce electron traps of desired depth in the alkali halide crystal lattice. The electron traps are preferred to be sufficiently deep to require a sufficiently high energy to remove the electron from the trap at temperatures desired for recording of the 3-D holograms. The traps that require ionization energy of 0.4 eV or higher are preferred.

It is thought that additively colored alkali halide crystals having so-called F-centers are especially suitable since they create electron flows of high intensity. Such additively colored crystals may be produced for example by heating alkali halide media in the presence of free alkali metals such as potassium and sodium, or by x-ray irradiation.

Alkali halide crystals having the F-centers exhibit certain characteristic F-center absorption bands in specific regions of electromagnetic spectra. For example, a crystal of KCL grown by the method described herein has the F-center absorption band in the range of from about 450 nm to about 600 nm with a maximum at approximately about 560 nm. The F-center absorption band for the KBR crystal is observed in the range of from about 500 nm to about 700 nm, with the maximum at approximately about 620 nm.

It is believed that in certain conditions, the F-centers may be transformed into so-called X-centers, and ultimately into colloidal clusters, where the concentration of the X-centers is especially high. Thus, F-centers may be transformed into X-centers, and further into colloidal clusters at certain process parameters by the action of the light beams. The light beams are believed to cause the X-centers to align along their path, specifically in the area where the light beams interact within the crystal.

Thus, to record a 3-D hologram, two coherent light beams, preferably two laser beams, which intersect at an angle $\alpha$, are directed at the alkali halide crystal C, preferably containing the F-centers. The coherent light beams produce interference patterns inside the crystal, the areas of larger and smaller light intensity. In certain conditions, the coherent light beams induce formation of the X-centers, and ultimately the colloidal clusters, which are believed to align themselves in accordance with the interference pattern, thus producing a 3-D hologram.

Several 3-D holograms may be recorded in essentially the same or very proximately placed location(s) within the crystal. Selecting the location(s) where the recording beams intersect may affect the placement the hologram(s) within the crystal. If several different holograms were recorded, the external beam of light would be deflected at several angles.

Various conditions may be used for growing crystals of alkali halides suitable for production of the 3-D holograms in accordance with the invention. For example, potassium chloride (KCL) and potassium bromide (KBR) may be grown both in air and in vacuum. Preferably, the KCL crystals are grown in air.

EXAMPLE 1

The wafer of KCL, prepared from potassium chloride obtained from Donetsk Chemical Factory, Ukraine, has been heated in a hermetic metal camera in the presence of air and 3 to 5 g of potassium for 24 hours at about 640° C. After heating, the hermetic camera has been rapidly cooled down to room temperature. The wafer of alkali halide became additively colored, and contained F-center absorption bands. The processed alkali halide wafer was carved into plates or crystals of required size. The preferred size is 10×10×0.5 mm. The faces of the plates or crystals were polished using diamond disks until mirror surfaces formed, which took approximately 10 seconds. The crystals prepared by the above-described method were used to record three-dimensional holograms.

As explained earlier, two intersecting laser beams may be used to record the 3-D holograms. The exemplary light source for recording the holograms is helium He—Ne laser. However, other light sources may also be used. For example, He—Cd laser may be used to record holograms in NACL. Air or gas convection or movement should be significantly minimized or eliminated from the surroundings of the crystal. Preferably, the crystal is held in a vacuum. The preferred pressure during the recording is $10^{-3}$ torr or less.

Also, it is preferred that, during the recording, the crystal is firmly held in place. The vibrations, shaking and other disturbance should be minimized. Thus, the use of some type of crystal stabilization apparatus is preferred.

The preferred recording temperature for alkali halide media is over 200° C. The preferred temperature for KCL crystals is 280° C. or above. The most preferred temperature of recording in KCL media is 280° C.

The preferred wavelength of light used for recording the hologram is within the range of the wavelengths of the F-center absorption bands. For example, for potassium chloride media, the preferred wavelength for recording a hologram is from about 450 nm to about 650 nm. The preferred alkali halide media is KCL.

EXAMPLE 2

A crystal of KCL prepared as described above was firmly held in place inside an invar airtight chamber. The air has been evacuated from the chamber until the vacuum of $10^{-3}$ torr was reached. With the help of an electric coil, the crystal was heated for approximately 10 minutes until the temperature reached 280 degrees C. Two beams of coherent light emitted by 50 mV helium He-Ne laser ($\lambda$=632.8 nm) were directed at the desired location within the crystal. After approximately eight minutes, a 3-D hologram with diffraction efficiency of approximately 40% had been recorded.

If recording of additional holograms is desired in the same crystal, the above process may be repeated. If crystal change is desired, the time interval of approximately 10 seconds may be necessary to restore the chamber temperature after the crystal change.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus for measuring pressure comprising:
   a) a holographic element containing at least one volume hologram;
   b) a reference member;

c) a sensing member coupled to he pressure being measured, and d) at least one light source;

wherein the apparatus operate by passing a reference light beam between the reference member and the holographic element, said reference beam having a constant optical path, and passing a sensing light beam between said sensing member and said holographic element, said sensing beam having an optical path that varies as a function of said pressure; said volume hologram diffracting said reference beam and said sensing beam to produce an information light beam, the intensity of which is measure of said pressure.

2. The apparatus of claim 1, wherein said sensing member is moving member, wherein the magnitude of said movement is a function of said pressure.

3. The apparatus of claim 1, wherein said sensing member is a diaphragm.

4. The apparatus of claim 3, wherein said diaphragm and said reference member are made from materials having substantially identical coefficients of thermal expansion.

5. The apparatus of claim 3, wherein said diaphragm and said reference member are parts of an integral unit made from the same material.

6. The apparatus of claim 1, wherein said holographic element is a crystal of alkali halide.

7. The apparatus of claim 1, wherein said light source is a laser source producing coherent monochromatic light.

8. The apparatus of claim 5, wherein said light source is a laser source producing coherent monochromatic light having a wavelength of from 635 nm to 680 nm.

9. The apparatus of claim 8, further comprising a sensing wave guide element for passing said sensing light beam and a reference wave guide element for passing said reference light beam.

10. The apparatus of claim 4, wherein said diaphragm and said holographic element are not in direct contact.

11. The apparatus of claim 4, further comprising a sensing wave guide element for passing said sensing light beam and a reference wave guide element for passing said reference light beam, wherein said wave guide elements are not in direct contact with said diaphragm or said reference member.

12. The apparatus of claim 11, further comprising a remote component having said diaphragm and said reference element, and a measuring component having said hologram and said light source.

13. The apparatus of claim 1, wherein said holographic element includes a plurality of volume holograms.

14. The apparatus of claim 1, wherein said apparatus is a pressure sensing gauge.

15. The apparatus of claim 1, wherein said apparatus is a scale.

16. The apparatus of claim 13, wherein said apparatus is a scale.

17. The apparatus of claim 1, wherein said sensing member comprises transparent material having an index of refraction that changes as a function of said pressure coupled to said sensing member, wherein aid sensing light beam passes through said transparent material.

18. The apparatus of claim 17, said transparent material having a low photo-elastic co-efficient.

19. An apparatus for measuring pressure comprising:

a) a light source capable of emitting at least one primary light beam;

b) a reference member having a reference surface;

c) a moving member having a sensing surface and a load surface, said moving member capable of movement or displacement the magnitude of which is a function of pressure applied onto said load surface of said moving member;

d) a holographic element having at leas one volume hologram located in alignment with said light source, the distance between said at least one volume hologram and said reference surface being substantially constant; and e) at least one signal detector;

wherein, in operation of said apparatus, said at least one volume hologram splits said at least one primary light beam into a first secondary beam and a second secondary beam directed respectively onto said sensing surface of said moving member and said reference surface, wherein said first and second secondary beams are reflected thereby providing respectively a sensing beam having an optical path that changes as a function of pressure applied onto the load surface of said moving member, and a reference beam having a substantially constant optical path, said sensing beam and said reference beam being reflected toward said at least one volume hologram herein said sensing beam and said reference beam interact thereby providing at least one information beam being detected by said at least one signal detector.

20. The apparatus of claim 19, further comprising a body including said reference member, said moving member having a first end, a second end, an a central portion, said first end and said second end being rigidly attached to said body thereby upon pressure being applied to said load surface of said moving member, said first end and said second end remain stationary and said central portion moves or deflects, said sensing surface of said moving member having a sensing region located within said central portion of said moving member, said sensing region reflecting said first secondary beam.

21. The apparatus of claim 20, further comprising a sensing wave guide element for passing said sensing light beam and said first secondary light beam, and a reference wave guide element for passing said reference light beam and said second secondary light beam, wherein said wave guide elements are not in direct contact with said diaphragm or said reference member.

22. The apparatus of claim 21, further comprising a remote component including said body, and a measuring component having said holographic element and said light source.

23. The apparatus of claim 22, wherein said moving member and said reference member are made from the same material whereby the thermal expansion of said moving member and said reference member is substantially identical.

24. The apparatus of claim 19, wherein said holographic element is a crystal of alkali halide.

25. The apparatus of claim 19, wherein said light source is a laser source producing coherent monochromatic light.

26. An apparatus or measuring pressure comprising:

a. a light source capable of emitting at least one primary light beam;

b. a reference member having a reference surface;

c. a stationary member having a beam-return surface;

d. an optically-transparent photo-elastic element having a load surface, said photo-elastic element possessing an index of refraction that changes as a function of pressure applied onto said load surface;

e. a holographic element having at least one volume hologram located in alignment with said light source, the distance between said at least one volume hologram and said reference surface being substantially constant; and f. at least one signal detector;

wherein, in operation of said apparatus, said at least one volume hologram splits said at least one primary light beam into a first secondary beam and a second secondary beam;

said first secondary beam being directed onto said beam-return surface that reflects said first secondary beam thereby providing a sensing beam, at least one of said first secondary beam and said sensing beam passing through said optically-transparent photo-elastic element thereby said sensing beam has an optical path that is a function of pressure applied onto the load surface of said photo-elastic element, said second secondary beam being directed onto said reference surface and being reflected thereby providing a reference beam having a substantially constant optical path, said sensing beam and said reference beam being reflected toward said at least one volume hologram wherein said sensing beam and said reference beam interact thereby providing at least one information beam being detected by said at least one signal detector.

* * * * *

UNITED STATES PATENT AND TRADEMARK OFFICE
CERTIFICATE OF CORRECTION

PATENT NO. : 6,856,399 B2
DATED : February 15, 2005
INVENTOR(S) : Igor Kuskovsky et al.

It is certified that error appears in the above-identified patent and that said Letters Patent is hereby corrected as shown below:

Column 17,
Line 1, "he" should read -- the --.
Line 4, "operate" should read -- operates --.
Lines 13 and 15, insert -- a -- after "is".
Line 59, "aid" should read -- said --.

Column 18,
Line 4, "leas" should read -- least --.
Line 22, "herein" should read -- wherein --.
Line 28, "an" should read -- and --.

Signed and Sealed this

Seventeenth Day of May, 2005

JON W. DUDAS
*Director of the United States Patent and Trademark Office*